United States Patent Office 3,795,727
Patented Mar. 5, 1974

3,795,727
PROCESS FOR RECOVERING PURE AQUEOUS SOLUTION OF FERRIC CHLORIDE AND AQUEOUS SOLUTION OF METAL CHLORIDES FREE OF FERRIC CHLORIDE
Toshio Yamamura, Yuichi Omote, Shiro Sato, and Tomochika Hiyama, Shibukawa, Japan, assignors to Kanto Denka Kogyo Co., Ltd., Tokyo, Japan
No Drawing. Original application Sept. 15, 1969, Ser. No. 858,173. Divided and this application Oct. 4, 1971, Ser. No. 186,417
Claims priority, application Japan, Sept. 19, 1968, 43/67,838; Sept. 20, 1968, 43/68,070
Int. Cl. C01g 23/04, 49/10
U.S. Cl. 423—70
2 Claims

ABSTRACT OF THE DISCLOSURE

An aqueous solution of metal chlorides is subjected to liquid-liquid contact with an alkyl, aryl or aralkyl ketone or ether having 4 to 10 carbon atoms so that the ferric chloride is transferred to the organic ketone or ether extractant phase and the remaining metal chlorides remain in the aqueous phase. The extractant phase is contacted with water to transfer the ferric chloride into a second aqueous phase.

---

This is a division, of application Ser. No. 858,173, filed Sept. 15, 1969, now U.S. Pat. No. 3,622,269.

The present invention relates to a process for recovering an aqueous solution of ferric chloride and an aqueous solution of metal chlorides containing iron chloride. More particularly, it relates to a process for recovering ferric chloride from an aqueous solution containing ferric chloride by solvent extraction which comprises subjecting an aqueous solution of metal chlorides containing ferric chloride to a liquid-liquid contact with an alkyl, aryl or aralkyl ketone or ether having 4–10 carbon atoms, transferring ferric chloride in said aqueous solution to the organic ketone or ether extractant phase and obtaining an aqueous solution of metal chlorides substantially free from ferric chloride as the raffinate and contacting the iron loaded organic extractant phase with water and transferring the ferric chloride from the organic extractant phase to the aqueous phase, thus obtaining a pure aqueous solution of ferric chloride.

There have been several disclosures in the literature concerning methods for recovering iron values and simultaneously obtaining an aqueous solution of metal chlorides free from iron chloride from an aqueous solution of metal chlorides. For example, metallic iron is added to such aqueous solution to convert all the iron values into the ferrous state and the aqueous solution thus obtained is concentrated to separate out crystals of ferrous chloride so that the iron value is recovered as ferrous chloride crystals, while an aqueous solution of metal chlorides having a reduced iron content is obtained as the filtrate. To our knowledge, none of these known methods has been satisfactory for the separation of iron values.

We have discovered that when a hydrochloric acid aqueous solution containing ferric chloride is contacted with an alkyl, aryl or aralkyl ketone having 4–10 carbon atoms, such as methylisobutyl ketone and cyclohexanone, or an alkyl, aryl or aralkyl ether containing 4–10 carbon atoms, such as diisopropyl ether and anisole, and when the HCl concentration in said aqueous solution and/or the concentration of the other coexisting metal chloride or chlorides in said aqueous solution are (is) maintained sufficiently high, the $FeCl_3$ component alone can be easily transferred into said ketone or ether extractant and the raffinate is an aqueous solution of hydrochloric acid or metal chlorides free from ferric chloride. Then, the $FeCl_3$ in the iron-loaded organic extract will be again transferred into the water phase by contacting the organic phase with water, and an aqueous solution of pure $FeCl_3$ can be recovered.

As ketones for the extract, we have tested acetone, methylethyl ketone, diethyl ketone, methylisopropyl ketone, methylisobutyl ketone, acetylacetone, diethyl ketone, cyclopentanone, cyclohexanone, dibutyl ketone, acetophenone, phenylethyl ketone, phenylpropyl ketone, etc. and we have found that the ketones having 4 to 10 carbon atoms such as methylketones, cyclopentanone and cyclohexanone have a particularly excellent quality as an extractant. Acetone is not preferable, for it is inter-soluble with an aqueous solution of iron chloride. Methylethyl ketone among the methylketones has also such intersolubility, to some extent, but, if it is carried in a suitable solvent or carrier, for example, in kerosene or a hydrocarbon such as benzene, toluene and xylene or a chlorinated hydrocarbon such as carbon tetrachloride, trichloroethylene, tetrachloroethylene, dichloroethanes, trichloroethanes, tetrachloroethanes, monochlorobenzene and o-dichlorobenzene, a very effective extraction is possible. Furthermore, a mixture of methylethyl ketone and cyclohexanone or a mixture of these compounds with kerosene is suitable for the organic extractant. Also, we have found that ethers having 4–10 carbon atoms such as diethyl ether, ethylpropyl ether, dipropyl ether, diisopropyl ether, dibutyl ether, anisole, dioxanes, etc. are excellent extractants for extracting ferric chloride. With respect to ethers, like in the case of ketone, a mixture of ethers or a mixture of ethers and such hydrocarbon or chlorinated hydrocarbon carriers as above mentioned are suitable as an extractant.

As the starting material for the process of this invention, that is to say, the aqueous solution of metal chlorides containing ferric chloride, any hydrochloric acid aqueous solution containing iron chloride and other metal chlorides are applicable, but it should be preferably adjusted preliminarily as follows: (1) It is preferred to preliminarily oxidize the $FeCl_2$ in the aqueous solution to $FeCl_3$, because the ketone or ether extractant used in this invention extracts only $FeCl_3$. If this step is omitted, any iron value in the form of $FeCl_2$ will be left in the raffinate. (2) It is required either that at least 1 mole of free HCl to $FeCl_3$ be present in the solution or that more than 1 g. equivalent of Cl ion derived from metal chlorides other than ferric chloride to $FeCl_3$ be present. The chlorine ion concentration of the aqueous starting solution of metal chlorides containing ferric chloride is at least fourfold equivalent to the concentration of the ferric ion. If this is not satisfied, the distribution of $FeCl_3$ in the organic phase becomes bad. The ratio of the concentration of $FeCl_3$ in the organic phase to that in the aqueous phase greatly varies depending on the ratio of HCl to $FeCl_3$ or the ratio of $TiCl_4$ or $AlCl_3$ to $FeCl_3$ in the aqueous solution. As the concentration of hydrochloric acid increases, $FeCl_3$ has a tendency of being distributed to a greater extent in the organic phase. Furthermore, when titanium chloride, aluminium chloride or other metallic chloride is present instead of hydrochloric acid and the concentration of these compounds is high, $FeCl_3$ will be more easily and efficiently extracted into the organic phase. (3) The concentration of $FeCl_3$ in said aqueous solution of metal chlorides should be preferably at least more than 100 g./l. The distribution of the metal chlorides other than $FeCl_3$ to the organic extractant will decrease as the concentration of $FeCl_3$ increases. Furthermore, if the concentrations of $TiCl_4$, $AlCl_3$ and other metal chlorides are high and the concentration of $FeCl_3$ is low, the intersolubility between the aqueous phase and the organic phase will increase and sometimes a uniform phase will be formed so that the extraction and separation of ferric chloride becomes difficult to carry out.

Accordingly, it is usually favorable that the starting aqueous soltuion of metal chlorides containing ferric chloride has a concentration of HCl of about 3–8N and that a mixture of the ketone or other solvent of this invention, with a suitable carrier as above described such as a hydrocarbon or a chlorinated hydrocarbon is used as the extractant in order to decrease the intersolubility of the organic phase with the aqueous phase.

In the organic phase thus obtained in which ferric chloride is dissolved, other metal ions are contained only to a small extent. For example, even when chlorides of $Al^{3+}$, $Mg^{2+}$, $V^{4+}$, $Mn^{2+}$, $Cr^{3+}$ and the like are contained in the starting solution, they are substantially not distributed or contained in the organic phase. Though they might have some tendency of being distributed in the organic phase, they are pushed away by $FeCl_3$ from the organic phase and remain in the aqueous phase when $FeCl_3$ is distributed in a substantial amount in the organic phase. In order to actualize this phenomenon effectively, it is preferable to adopt a countercurrent extraction operation, in at least two stages and usually less than six stages.

Next, from the iron-loaded organic phase, the $FeCl_3$ component should be reversely extracted to the aqueous phase by contacting said organic phase with an aqueous medium such as water. In this step, it is necessary that the concentration of hydrochloric acid or ferric chloride in the aqueous phase be low. In conducting this operation, it is also preferable to adopt a counter-current extraction operation in 2 to 6 stages.

In the extraction and separation step of ferric chloride according to the present invention, the optimum amount of the ketone or ether extractant required for the starting aqueous solution will be influenced the concentration of hydrochloric acid, as will be apparent from the fact that the distribution ratio of $FeCl_3$ varies depending upon the concentration of hydrochloric acid in the aqueous solution. However, at least two moles of the ketone or ether extractant are required per 1 mole of $FeCl_3$, and when a mixed solvent of ketone and hydrocarbon or ether and hydrocarbon is used as the extractant, similarly at least 2 moles of ketone or ether per 1 mole of $FeCl_3$ are required to achieve a complete recovery of ferric chloride value.

In the aqueous solution of ferric chloride obtained by the aforementioned reverse extraction there will be continued a, certain amount of ketone or ether used as the extractant. Therefore, said aqueous solution will be washed with kerosene or similar solvent and almost all of the ketone or ether contained therein will be removed. Also, it will be possible to heat the aqueous solution so as to evaporate a portion of the water and simultaneously remove the ketone or ether by a steam distillation.

The aqueous solution of ferric chloride thus obtained can be used satisfactorily for many industrial purposes including its uses as a chemical reagent and a raw material for making iron oxide. For example, iron oxide which will be produced from the ferric chloride aqueous solution obtained according to our process is of a very high purity and is excellent as a material for producing pure iron, pigment and ferrite raw material.

The starting aqueous solution of metal chlorides containing $FeCl_3$ as mentioned above can be prepared in various ways. Examples which will be most advantageous in industrial use will be described in the following.

An aqueous solution obtained by leaching ilmenite, high titanium slag and other titaniferous material with hydrochloric acid contains titanium chloride ($TiCl_4$), iron chlorides ($FeCl_2$, $FeCl_3$) and a small amount of other metal chlorides, for example vanadium chloride, chromium chloride, magnesium chloride, etc. In said aqueous solution, air, oxygen, chlorine or other oxidizing agent will be added to oxidize the divalent ferrous ion into trivalent ferric ion. In addition the other metal ions contained in the aqueous solution will be made to be of a highly oxidized level. As mentioned above, for the purpose of keeping the metal ions in the solution at a highly oxidized level the, following oxidizing agents can be used; molecular oxygen, chlorine, hydrogen peroxide, permanganates, chromates, and gases containing one of these compounds. Among these, oxygen, oxygen containing gas, chlorine, chlorine containing gas, and mixtures thereof are particularly useful.

When the hydrochloric acid aqueous solution, mainly containing $Ti^{4+}$ and $Fe^{3+}$ thus obtained, is contacted with a ketone having 4–10 carbon atoms such as methylisobutylketone or cyclohexanone or an ether having 4–10 carbon atoms such as diisopropylether, the $FeCl_3$ values in the aqueous solution will be substantially transferred into the organic phase. In this operation, only $FeCl_3$ will be transferred into the organic phase and $TiCl_4$, $VCl_3$, $MnCl_2$, $CrCl_3$ and other metal chlorides will completely remain in the aqueous solution. In the prior art, amines, and organic phosphoric acid esters have been reported as being useful as organic extractants for ferric chloride. However, these organic solvents have various defects. For example, when an amine or an organic phosphoric acid ester is used as the extractant instead of the ketone or ether used in the present invention, colored material and solid matter will be produced during the extraction process. In addition, amines and organic phosphoric acid esters are difficult to purify by distillation since they have generally high boiling points and tend to decompose during the distillation operation. Further, organic phosphoric acid esters have a tendency to decompose by contact with hydrochloric acid. On the contrary, the ketones and ethers have 4 to 10 carbon atoms which will be used as the extractant in the process of the present invention, are free from such defects as noted above in such conventional organic extractants as amines and organic phosphoric acid esters and they can extract very effectively ferric chloride from the starting aqueous solution containing ferric chloride. As ketones or ethers, those having a boiling point of about 100–200° C. such as methylisobutyl ketone, cyclohexanone, diisopropyl ether and anisole are desirable, but any ketone or ether having 4–10 carbon atoms is suitable. These ketones and ethers can be very easily purified by distillation and they can be reused in the extraction operation easily, thus making the process of the present invention ecoomically advantageous.

The above-mentioned extraction process by using the ketone or ether extractant according to the present invention is particularly effective for the treatment of a hydrochloric acid aqueous solution obtained by leaching a titaniferous material such as ilmenite or high titanium ore with hydrochloric acid. It is supposed that the effective extraction of ferric chloride is caused by the fact that the distribution ratio of $Fe^{3+}$ into the organic extractant remarkably increases due to a salting out effect of $Ti^{4+}$ remaining in the aqueous phase.

The raffinate which is an aqueous solution of $TiCl_4$ and other metal chlorides free from ferric chloride should then be heated to a temperature above 80° C., preferably 100–110° C. to form a hydrate of titanium dioxide as a precipitate. In this case, it is also advantageous to add titanium oxide or titanium oxychloride sol as the nucleating solution, which has been separately prepared. This nucleating solution can be prepared by taking out a portion of an aqueous $TiCl_4$ solution which is to be hydrolyzed, partially neutralizing the same by sodium hydroxide so as to make it to such a state as $TiCl(OH)_3$ or $TiCl_2(OH)_2$ and finally diluting the same. This nucleating solution will be added to the bulk solution heated at a temperature of 100–110° C. Since said auqeous $TiCl_4$ solution contains a very small amount of metal chlorides other than titanium compounds, this hydrolysis step and subsequent filtration step are comparatively simpler than those used in the conventional sulphuric acid method.

The titanium dioxide hydrate thus produced is heated to a temperature above 600° C. in a rotary kiln, and titanium dioxide having a crystalline structure of a rutile type is obtained. Titanium dioxide obtained according to the present process is free from an anatase type titanium dioxide and has excellent qualities as a pigment.

As titaniferous ores which can be used in the present invention, those containing above 20 weight percent $TiO_2$ values are preferable and iron sand or ilmenite can be most advantageously used. The reaction of a titaniferous ore with hydrochloric acid can be advantageously carried out at a temperature of 60–100° C., and most preferably 70–80° C. Further, the concentration of hydrochloric acid should be at least 6 N at the time of starting the reaction. It is most preferable to carry out the reaction always by maintaining the reaction mixture saturated with HCl by supplying HCl gas during the reaction. The amount of hydrochloric acid as 35% solution supplied to the titaniferous material is advantageously 2–4 times as much by weight.

In addition to the aforementioned titaniferous ores, limonite, hematite and other iron ores, iron containing alumina ores such as laterite, magnite and bauxite can be leached by hydrochloric acid to produce a hydrochloric acid aqueous solution containing ferric chloride and the obtained aqueous solution can be treated by the process of the present invention. For example, an aqueous solution obtained by dissolving bauxite into hydrochloric acid could be successfully treated with diisopropyl ether to extract the iron-loaded extractant phase and obtaining an aqueous solution of aluminum chloride as the raffinate. From said extractant phase, pure ferric chloride could be obtained by back extraction in such a manner as described above.

The process of the present invention can be advantageously utilized for the treatment of waste liquors produced in the hydrochloric acid pickling process of steel and the like.

The invention will now be described with reference to the following examples.

EXAMPLE 1

An aqueous solution obtained by dissolving iron sand produced in Chiba Prefecture, Japan, into a concentrated hydrochloric acid had the following composition by analysis: $FeCl_3$, 183 g./l.; $FeCl_2$, 103 g./l.; $TiCl_4$, 48 g./l.; HCl, 50 g./l.

1 l. of this acidic leachate was mixed with 1 l. of methylisobutyl ketone and this mixture was shaken at room temperature and then the organic and aqueous acidic layers were allowed to separate and the organic upper layer was decanted from the two phase system. Analysis of the organic phase showed that 165 g. of $FeCl_3$ and 31 g. of HCl were transferred into the methylisobutyl ketone phase. To this methylisobutyl ketone phase, 0.5 l. of water was added and shaken at a room temperature to effect the water stripping of the iron from the organic phase which gave an aqueous solution of $FeCl_3$ from which 145 g. of $FeCl_3$ was recovered. In the aqueous solution of $FeCl_3$ thus obtained, $Fe^{2+}$ and $Ti^{4+}$ were not substantially found. In addition, though, in the crude aqueous solution obtained by dissolving iron sand into hydrochloric acid, Mg, Al, Mn, Cr, V and the like were also contained in small amounts and these components substantially remained in the aqueous raffinate without being extracted by methylisobutylketone. Accordingly, in the aqueous solution of $FeCl_3$ obtained by said water stripping these impurities were not present in substantial amounts.

EXAMPLE 2

The same type of ore and procedure as described in the Example 1 was carried out, except that cyclohexanone was used instead of methylisobutyl ketone, resulting in a final aqueous solution of $FeCl_3$, from which 135 g. of $FeCl_3$ were recovered. In this aqueous solution. $Fe^{2+}$, $Ti^{4+}$ and ions of other impurities were not present in substantial amounts. Also, the same procedure as described in Example 1 was caried out, except diisopropyl ether was used instead of methylisobutyl ketone, as used substantially the same results as in Example 1.

EXAMPLE 3

Chlorine gas was blown into 1 l. of the same starting aqueous solutions as used in Example 1 and the di-valent iron salt contained in the solution was converted into a tri-valent iron salt. The soltuion thus obtained had the following composition by analysis: $FeCl_3$, 317 g./l.; $FeCl_2$, 1.2 g./l.; $TiCl_4$, 49 g./l.; HCl, 55 g./l.

1 l. of methylisobutyl ketone was mixed with 1 l. of this acidic solution thus obtained and was shaken at room temperature and then the organic and aqueous acidic layers were allowed to separate and the organic upper layer was decanted from the two phase system. Analysis of the organic phase showed that 206 g. of $FeCl_3$ was transferred into the methylisobutyl ketone phase. 1.5 l. of water was added to thee abovementioned ketone phase and shaken to effect the water stripping of the iron from the organic phase which gave an aqueous solution into which 183 g. of $FeCl_3$ and 36 g. of HCl were transferred. No trace of $Fe^{2+}$ and $Ti^{4+}$ was observed in the aqueous solution of $FeCl_3$ thus obtained. Comparing this procedure with Example 1, the amount of the recovered $FeCl_3$ increased by 38 g. Then, to about 0.6 l. of the purified aqueous solution of $FeCl_3$ thus obtained 0.1 l. of kerosene was added, shaken and separated. This procedure was carried out twice so that substantially all of the methylisobutyl ketone contained in the aqueous solution was transferred into the kerosene phase. The aqueous solution of $FeCl_3$ thus obtained was evaporated as it was and 660 g. of 24% hydrochloric acid was obtained as the distillate and 90 g. of a reddish brown ferric oxide ($Fe_2O_3$) was obtained as the evaporated residue. This ferric oxide was then calcined at 500° C. and ferric oxide having a purity more than 99% and free from chlorine was obtained. This ferric oxide was suitable as a raw material for making ferrite and pigment.

EXAMPLE 4

An aqueous hydrochloric acid solution obtained by blowing chlorine gas into a concentrated hydrochloric acid solution containing scrap iron, had a composition of $FeCl_3$ 525 g./l., $FeCl_2$ 62 g./l. and HCl 2.1 g./l. 1 l. of methylisobutyl ketone was mixed with 1 l. of said aqueous solution and was shaken and the organic and aqueous acidic layers were allowed to separate. Analysis of the organic phase showed that the $FeCl_3$ values transferred to the methylisobutyl ketone phase was 4.5 g.

However, when hydrochloric acid was added to the above starting aqueous solution so as to increase the HCl concentration to 120 g./l. ($FeCl_3$ mole:HCl mole=about 1:1) and 1 l. of methylisobutyl ketone was mixed with this solution thus obtained and shaken, an analysis of the obtained extract phase showed that the $FeCl_3$ values transferred to the methylisobutyl ketone phase increased to 219 g. When the amount of HCl added thereto was increased the $FeCl_3$ transferred to the methylisobutyl ketone phase was further increased. The higher the concentration of $FeCl_3$ in the methylisobutyl ketone phase is, the higher will be the concentration of $FeCl_3$ in the $FeCl_3$ aquous solution which will be obtained by back-extracting the acid organic phase with water.

EXAMPLE 5

A waste acid of hydrochloric acid pickling of steel had the following composition by analysis: $FeCl_2$, 240 g./l.; HCl, 58 g./l.

Said waste acid was oxidized by blowing oxygen gas into said acid in order to convert $Fe^{2+}$ to $Fe^{3+}$. The solution obtained by adding hydrochloric acid to said waste acid had the following composition by anaylsis: $FeCl_3$, 233 g./l.; HCl, 98 g./l.

To 1 l. of this solution, 1 l. of a mixture of diisopropyl ether and kerosene was mixed and shaken, and then the organic and aqueous acidic layers were allowed to separate. Analysis of the organic phase showed that 170 g.

of FeCl₃ and 34 g. of HCl were transferred to the organic phase. Then 0.5 l. of water was added to the organic phase containing FeCl₃ and shaken to effect the water-stripping of the iron from the organic phase. This gave an aqueous solution of FeCl₃, from which 164 g. of FeCl₃ was recovered.

In addition, though Mn, Cr and the like were contained in the starting waste acid pickling from the process, substantially all of these elements remained in the raffinate after the above extraction with the above mixed extractant of ether and kerosene. Accordingly, Mn, Cr and other impurities were not contained in the aqueous solution of FeCl₃ obtained by the above back-extraction.

EXAMPLE 6

An aqueous solution prepared by adding hydrochloric acid to the acidic leachate solution obtained by adding 1000 g. of 20% HCl to 100 g. of bauxite containing 20% iron oxide ($Fe_2O_3$) and dissolving the bauxite by heating had the following composition by analysis: FeCl₃, 34 g./l; AlCl₃, 242 g./l.; HCl, 102 g./l.

200 ml. of a mixture of methylisobutyl ketone and benzene was mixed with 100 ml. of the above aqueous solution and was shaken and then the organic and aqueous acidic layers were allowed to separate. Analysis of the aqueous phase showed that FeCl₃ was not substantially found in the aqueous phase. $Al_2O_3$ was prepared by the hydrolysis of said aqueous phase containing mainly AlCl₃ thereby obtaining $Al_2O_3$ substantially free from iron. This $Al_2O_3$ product is very useful as a soda-free alumina. A pure aqueous solution of FeCl₃ was obtained by the back extraction of the organic phase containing FeCl₃.

EXAMPLE 7

1 l. of methylisobutyl ketone was mixed with 1 l. of an aqueous acidic solution having the composition of TiCl₄ (250 g./l.), FeCl₃ (13 g./l.) and HCl (230 g./l.) and shaken at room temperature and then the organic and aqueous acidic layers were allowed to separate. 1.5 l. of the aqueous phase were obtained. That is to say, methylisobutyl ketone was dissolved considerably into the aqueous phase and the volume of the ketone phase remarkably decreased. Further, the amount of FeCl₃ transferred to the ketone phase was only 2.7 g. This fact means that, when the concentration of FeCl₃ is low and that of TiCl₄ and that of HCl are high in the starting aqueous solution, the extraction rate of FeCl₃ will be small.

Then, the same procedure as mentioned above was carried out except that 1 l. of the above starting aqueous solution was mixed with 1 l. of a mixture of methylisobutyl ketone and kerosene (50:50 by volume). In this case, the volume of the methylisobutyl ketone-kerosene phase was 0.93 l., from in which 12.6 g. of FeCl₃ was extracted and the FeCl₃ remaining in the aqueous phase was only 0.4 g. These results show that, when the intersoluble amount between the organic extractant phase and the aqueous phase becomes large, the distribution of FeCl₃ to the organic phase becomes small and, when a mixed extractant obtained by mixing kerosene with the above ketone instead of using the ketone only, the intersoluble amount between the ketone phase and the aqueous phase decreases and also the extraction rate of FeCl₃ is improved.

EXAMPLE 8

To 50 g. of ilmenite produced in Australia (TiO₂ 55.4%, FeO 15.0%, $Fe_2O_3$ 25.9%, remainder 3.7%) 200 g. of 35% hydrochloric acid was added and shaken for 12 hours while being heated at 70° C. During this period HCl gas was blown into the reactor so as to always saturate the mixture with HCl gas. After 12 hours the reaction mixture was left standing and undissolved tail ore was separated from the aqueous leachate solution. The amount of the tail ore was 4.4 g. The reaction ratio of the ore was 91.2%. FeCl₂ in this aqueous leachate solution was oxidized to FeCl₃ by blowing oxygen into the solution. To 100 ml. of this oxidized aqueous solution thus obtained, 200 ml. of a mixed extractant solution of methylisobutyl ketone-kerosene (volume ratio= 1:1) was added and shaken. Substantially all of the FeCl₃ in the aqueous solution was transferred to the organic extractant phase. The organic phase containing FeCl₃ thus obtained was contacted with water and substantially all of FeCl₃ was transferred to the aqueous phase by the back extraction. The aqueous solution of FeCl₃ thus obtained had a high purity, which was 99% calculated on the basis of oxide.

The raffinate was an aqueous solution of hydrochloric acid, containing mainly TiCl₄. This solution was kept at a temperature above 100° C. or boiled and a precipitate of titanium hydroxide was produced. The precipitate was filtered and washed with water and then calcined at a temperature above 600° C. to obtain a white titanium oxide of high purity.

EXAMPLE 9

Ilmenite produced in Australia was digested with hydrochloric acid in the same way as described in the Example 8 and then oxidized with oxygen. The composition of the leachate aqueous solution was as follows:

| | G./l. |
|---|---|
| TiCl₄ | 316 |
| FeCl₃ | 235 |
| MnCl₂ | 8.15 |
| MgCl₂ | 7.45 |
| AlCl₃ | 2.70 |
| VCl₄ | 1.54 |
| ZnCl₂ | 0.12 |
| HCl | 159 |

By using 0.75 l. of a mixture of methylisobutyl ketone-benzene (volume ratio=1:1) as an extractant to 1 l. of the above-mentioned leachate solution, a counter-current 3-stage extraction was carried out.

The organic phase obtained by this extraction was back-extracted by a counter-current 4-stage extraction by using 0.5 l. of water and an aqueous solution containing FeCl₃ in a concentration of about 470 g./l. was obtained. The purity of FeCl₃ in this aqueous solution was 99.97%. This excellent result is due to the fact that, though chlorides of Cr, V, Mn and other metals will be first extracted together with FeCl₃ to the above ketone phase in the above counter-current extraction, these impurities will be pushed out from the ketone phase toward the water phase as the concentration of FeCl₃ in the ketone phase increases in the counter-current extractor and finally the metal chloride contained in the ketone phase will become only FeCl₃.

On the other hand, an aqueous solution mainly containing TiCl₄ was obtained as the raffinate, in which the FeCl₃ concentration was reduced to less than 0.05 g./l.

To 100 cc. of this raffinate aqueous phase sodium hydroxide was mixed in a ratio of 2.5 mols per 1 mol of TiCl₄ present in the aqueous phase (stoichiometrically so as to form $Ti(OH)_{2.5}Cl_{1.5}$) and further water was added thereto so as to make the total volume of the solution to be 700 cc. This solution was added to the remaining 900 cc. of the above aqueous raffinate solution and the mixture was heated for 1 hour at a temperature of 100° C. The hydrate of TiO₂ was precipitated by the hydrolysis of TiCl₄. This hydrate was filtered and washed with pure water, calcined at a temperature of 900° C. for 12 hours, crushed and subjected to the finishing treatment, thus obtaining a white titanium oxide powder of pigment quality.

We claim:

1. A process for recovering separately (A) an essentially pure aqueous solution of ferric chloride and (B) an aqueous solution of titanium chloride substantially free from ferric chloride and for converting the titanium chloride to anhydrous titanium dioxide which comprises:

(1) dissolving an ilmenite with hydrochloric acid to obtain an initial acid solution, (2) contacting the initial acid solution with an oxidizing agent selected from the group consisting of molecular oxygen and chlorine and mixtures thereof to oxidize ferrous iron present in said initial acid solution into ferric iron;

(3) maintaining (a) the chlorine iron concentration of said initial acid solution at least four fold equivalent to the concentration of ferric ion, (b) the amount of said hydrochloric acid at least one molal equivalent to the amount of the ferric chloride present in said initial acid solution and (c) the ferric chloride concentration in said initial acid solution at least more than 100 g./l.;

(4) contacting the thus obtained initial acid solution with at least a twofold stoichiometric molar equivalent, based on the amount of the ferric chloride present in said initial acid solution, of methyl isobutyl ketone dissolved in an organic carrier solvent selected from the group consisting of hydrocarbons and chlorinated hydrocarbons, thus to extract ferric chloride values from said initial acid solution in the organic phase;

(5) separating the resulting iron-containing organic extract from the aqueous solution consisting essentially of titanium tetrachloride substantially free from ferric chloride as the raffinate;

(6) contacting said organic extract with an aqueous medium to back extract the ferric chloride values from said organic extract;

(7) separating the thus obtained aqueous extract solution of ferric chloride from the substantially iron-free organic solvent;

(8) admixing said raffinate with an aqueous nucleating seed solution of titanium oxychloride;

(9) heating the resulting solution to about 90° C. to about 110° C., to thereby precipitate hydrated titanium oxide;

(10) filtering said precipitated hydrated titanium oxide from said solution; and

(11) calcining said hydrated titanium oxide at a temperature above 600° C. to thereby obtain anhydrous titanium dioxide.

2. The process as defined in claim 1, wherein said organic carrier solvent is at least one member selected from the group consisting of benzene, toluene, xylene, kerosene and chlorinated hydrocarbons.

References Cited

UNITED STATES PATENTS

| | | | |
|---|---|---|---|
| 3,104,950 | 9/1963 | Ellis | 75—101 BE |
| 3,082,062 | 3/1963 | Pruess | 75—101 BE |
| 3,252,787 | 5/1966 | Shiah | 75—1 |
| 3,254,948 | 6/1966 | Stromberg et al. | 23—312 X |
| 3,428,427 | 2/1969 | Rarceric | 23—312 X |
| 3,529,932 | 9/1970 | Ilmoto et al. | 423—70 X |
| 3,211,521 | 10/1965 | George et al. | 75—101 BE |

OTHER REFERENCES

Dodson et al., "Journal of the American Chemical Society," vol. 58, 1936, pp. 2573–2577.

West, "Metallurgia," January 1951, pp. 41–46.

HERBERT T. CARTER, Primary Examiner

U.S. Cl. X.R.

75—101 BE; 423—82, 85, 112, 139, 610